(12) United States Patent
Jiang

(10) Patent No.: US 11,935,706 B2
(45) Date of Patent: *Mar. 19, 2024

(54) HYBRID ANODE AND ELECTROLYTIC CAPACITOR

(71) Applicant: Pacesetter, Inc., Sylmar, CA (US)

(72) Inventor: Xiaofei Jiang, Clemson, SC (US)

(73) Assignee: Pacesetter, Inc., Sylmar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,496

(22) Filed: Aug. 4, 2022

(65) Prior Publication Data

US 2022/0375692 A1 Nov. 24, 2022

Related U.S. Application Data

(63) Continuation of application No. 16/588,145, filed on Sep. 30, 2019, now Pat. No. 11,443,902.

(60) Provisional application No. 62/741,336, filed on Oct. 4, 2018.

(51) Int. Cl.
| | |
|---|---|
| *H01G 9/055* | (2006.01) |
| *C22C 21/00* | (2006.01) |
| *C25F 3/02* | (2006.01) |
| *H01G 9/008* | (2006.01) |
| *H01G 9/045* | (2006.01) |
| *H01G 9/052* | (2006.01) |

(52) U.S. Cl.
CPC ............ *H01G 9/045* (2013.01); *C22C 21/00* (2013.01); *C25F 3/02* (2013.01); *H01G 9/008* (2013.01); *H01G 9/052* (2013.01); *H01G 9/055* (2013.01)

(58) Field of Classification Search
CPC ........ H01G 9/045; H01G 9/055; H01G 9/052; H01G 9/008; C22C 21/00; C25F 3/02
See application file for complete search history.

(56) References Cited

U.S. PATENT DOCUMENTS

| | | | |
|---|---|---|---|
| 5,660,737 A | 8/1997 | Elias et al. | |
| 5,968,210 A | 10/1999 | Strange et al. | |
| 6,621,686 B1 | 9/2003 | Jenn-Feng et al. | |
| 7,092,241 B2 | 8/2006 | Sherwood | |
| 9,129,749 B2 | 9/2015 | Sherwood et al. | |
| 9,142,359 B2* | 9/2015 | Taira | H01G 9/052 |
| 9,378,897 B2 | 6/2016 | Taira et al. | |
| 9,842,704 B2 | 12/2017 | Zednicek et al. | |
| 11,443,902 B2* | 9/2022 | Jiang | H01G 9/055 |
| 2004/0134874 A1 | 7/2004 | Hossick-Schott et al. | |
| 2009/0273885 A1* | 11/2009 | Jiang | C25F 3/04 |
| | | | 205/661 |
| 2010/0011061 A1 | 5/2010 | Zhong et al. | |
| 2012/0094016 A1 | 4/2012 | Taira et al. | |
| 2013/0004850 A1 | 1/2013 | Shon et al. | |

(Continued)

FOREIGN PATENT DOCUMENTS

| | | | |
|---|---|---|---|
| CN | 107030286 A | * | 8/2017 |
| CN | 110957137 A | * | 4/2020 |
| EP | 2264728 B1 | | 12/2016 |

(Continued)

*Primary Examiner* — David M Sinclair

(57) ABSTRACT

A capacitor has an anode with one or more active layers that each includes fused particles positioned on a current collector. The current collector includes tunnels that extend from a first face of the current collector to a second face of the current collector.

19 Claims, 6 Drawing Sheets

(56) References Cited

U.S. PATENT DOCUMENTS

2015/0371782 A1  12/2015  Taira et al.

FOREIGN PATENT DOCUMENTS

| | | | |
|---|---|---|---|
| JP | 2000012387 A | | 1/2000 |
| JP | 2006245149 A | | 9/2006 |
| JP | 2008047633 A | | 2/2008 |
| JP | 2010003774 A | | 1/2010 |
| JP | 2010027822 A | * | 2/2010 |
| JP | 2010098163 A | | 4/2010 |
| JP | 2014135481 A | | 7/2014 |
| JP | 2014170862 A | | 9/2014 |
| JP | 2015204387 A | | 11/2015 |

* cited by examiner

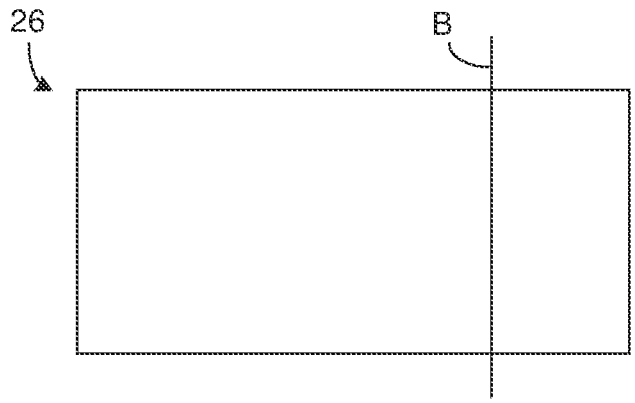
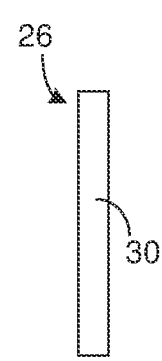
Figure 2A  Figure 2B
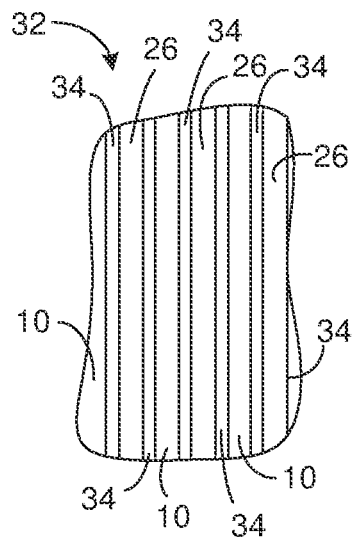
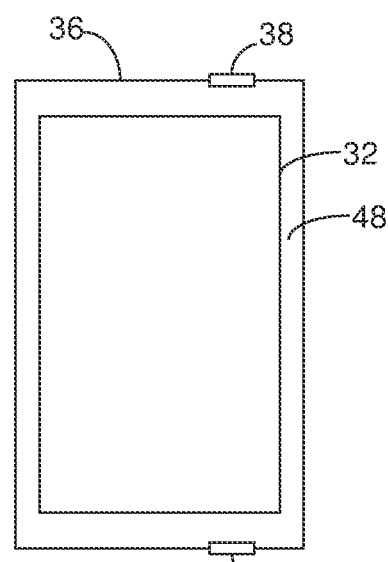
Figure 3A  Figure 3B
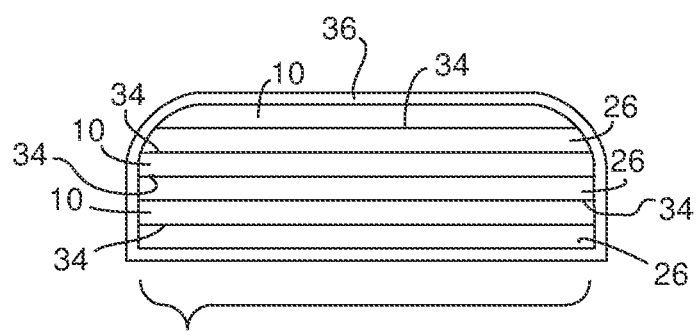
Figure 3C

HYBRID ANODE AND ELECTROLYTIC CAPACITOR

RELATED APPLICATIONS

This application is a continuation of U.S. patent application Ser. No. 16/588,145, filed on Sep. 30, 2019, entitled "Hybrid Anode and Electrolytic Capacitor," and incorporated herein in its entirety; and U.S. patent application Ser. No. 16/588,145 claims the benefit of U.S. provisional patent application Ser. No. 62/741,336, filed on Oct. 4, 2018, entitled "Hybrid Anode and Electrolytic Capacitor," and incorporated herein in its entirety.

FIELD

The invention relates to electrochemical devices. In particular, the invention relates to capacitors.

BACKGROUND

The energy density that an aluminum electrolytic capacitor can deliver is directly related to the total surface area of the aluminum anode in it. There are several approaches used to reach the desired surface area. However, some of the approaches require multiple anode layers to generate the desired capacitance. The use of multiple anode layers increases the complexity of the capacitor production process. Other approaches for generating anode with the desired surface area result in an undesirably low Delivered to Stored energy Ratios (DSR). However, a variety of capacitor applications require high delivered to stored energy ratios (DSR). For instance, implantable cardioverter-defibrillators (ICDs) preferably have capacitors with a DSR of at least 90%. As a result, there is a need for improved capacitor anodes.

SUMMARY

A capacitor has an anode with one or more active layers that each includes fused particles positioned on a current collector. The current collector includes tunnels that extend from a first face of the current collector to a second face of the current collector.

A method of fabricating an anode of a capacitor includes creating tunnels in a current collector such that the tunnels extend from a first face of the current collector to a second face of the current collector. The method also includes adding one or more active layers to the current collector. The one or more active layers each includes fused particles.

BRIEF DESCRIPTION OF THE FIGURES

FIG. 1A is a sideview of an anode that is suitable for use in the capacitor.

FIG. 1B is a cross-section of the anode shown in FIG. 1A taken along the line labeled B in FIG. 1A.

FIG. 2A is a sideview of a cathode that is suitable for use in the capacitor.

FIG. 2B is a cross-section of the cathode shown in FIG. 2A taken along the line labeled B in FIG. 2A.

FIG. 3A is a cross section of an electrode assembly where anodes are alternated with cathodes.

FIG. 3B is a schematic diagram of a capacitor that includes the electrode assembly of FIG. 3A positioned in a capacitor case.

FIG. 3C is a cross section of a capacitor illustrating the positioning of the electrode assembly relative to the capacitor case.

FIG. 4A is a topview of a sheet of material from which an anode will be fabricated.

FIG. 4B is a cross section of a portion the sheet of material of FIG. 4A taken at an interface between a face of the sheet of material and the atmosphere in which the sheet is positioned.

FIG. 4C illustrates a mask formed on a portion of the sheet of material of FIG. 4A and FIG. 4B.

FIG. 4D illustrates preliminary tunnels formed in the sheet of material of FIG. 4C or of FIG. 4A and FIG. 4B.

FIG. 4E illustrates widening of the preliminary tunnels shown in FIG. 4D.

FIG. 4F illustrates fused particles attached to the sheet of material of FIG. 4E.

FIG. 4G illustrates a dielectric formed on the particles of FIG. 4F and an anode metal oxide formed in the preliminary tunnels and on the faces of the sheet of material.

FIG. 4H illustrates removal of an anode the sheet of material.

DESCRIPTION

The capacitor has an anode with one or more active layers that include fused particles positioned on a current collector. In some instances, the current collector is positioned between active layers. The current collector includes tunnels extending from one face of the current collector to the other face of the current collector. Many prior capacitor anodes consist of an aluminum foil with channels etched into the foil. However, one limitation of the etch process is a limited tunnel aspect ratio, which means the etched channels can only grow to certain length before it stops. Therefore the thickness of the foil that can be etched with the channels is limited to ~150 µm. As a result, multiple anode layers are needed to generate the desired capacitance. When the anode includes porous active layers on a current collector, the active layers contribute to the capacitance, allowing the current collector to be thinner so tunnels can be etched through the current collector. The tunnels extending through the current collector allow an electrolyte to move from one side of the anode to the other side of the anode.

Another version of prior anodes includes particles bonded together. Voids between the particles provide pores through which an electrolyte can travel through the anode. It has been found that the capacitance of such a capacitor increased by decreasing the average size of the powder particles. However, decreasing the size of the powder particles results in narrower and more tortuous pore pathways through the anode. The small width of the pores combined with the tortuous nature of their path through the active layer generates resistance to the movement of electrolyte through the pores. The reduced movement of the electrolyte through the anode reduces the Delivered to Stored energy Ratio (DSR, electrical porosity) of the capacitor. When the anode includes porous active layers on the current collector, tunnels through the current collector can enhance movement of the electrolyte into and out of the active layers. Further, the active layers and the current collector can both contribute to the capacitance. As a result, the active layers can be thinner than prior layers of bonded particles. Reducing the thickness of the active layers can shorten the length of the pore pathways and can accordingly allow an electrolyte to move more freely within the anode. Accordingly, the anodes can retain increased capacity associated with smaller particle sizes without the associated loss of delivered to stored energy ratios (DSR).

Additionally, prior anode constructions resulted in a capacitor that showed a sharp DSR drop as the anode thickness exceeded ~400 or even ~500 µm. Surprisingly, the thickness of the disclosed anodes can exceed 850 µm without sacrificing DSR. Accordingly, the disclosed anodes can have a thickness greater than 500 µm or even 850 µm.

Figure 1A:
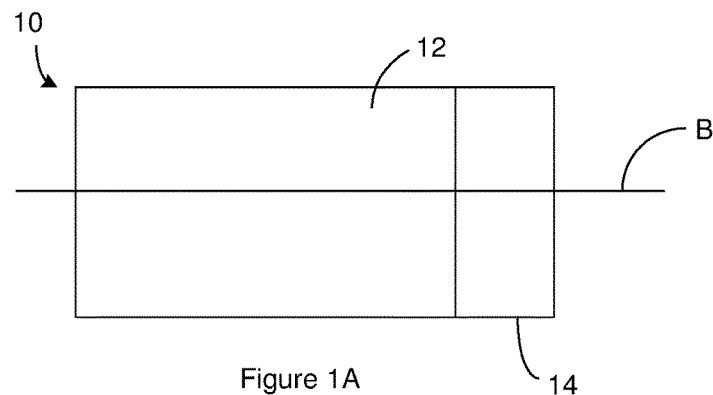
FIG. 1A through FIG. 1B illustrate the construction of an anode for use in a capacitor.
Figure 1B:
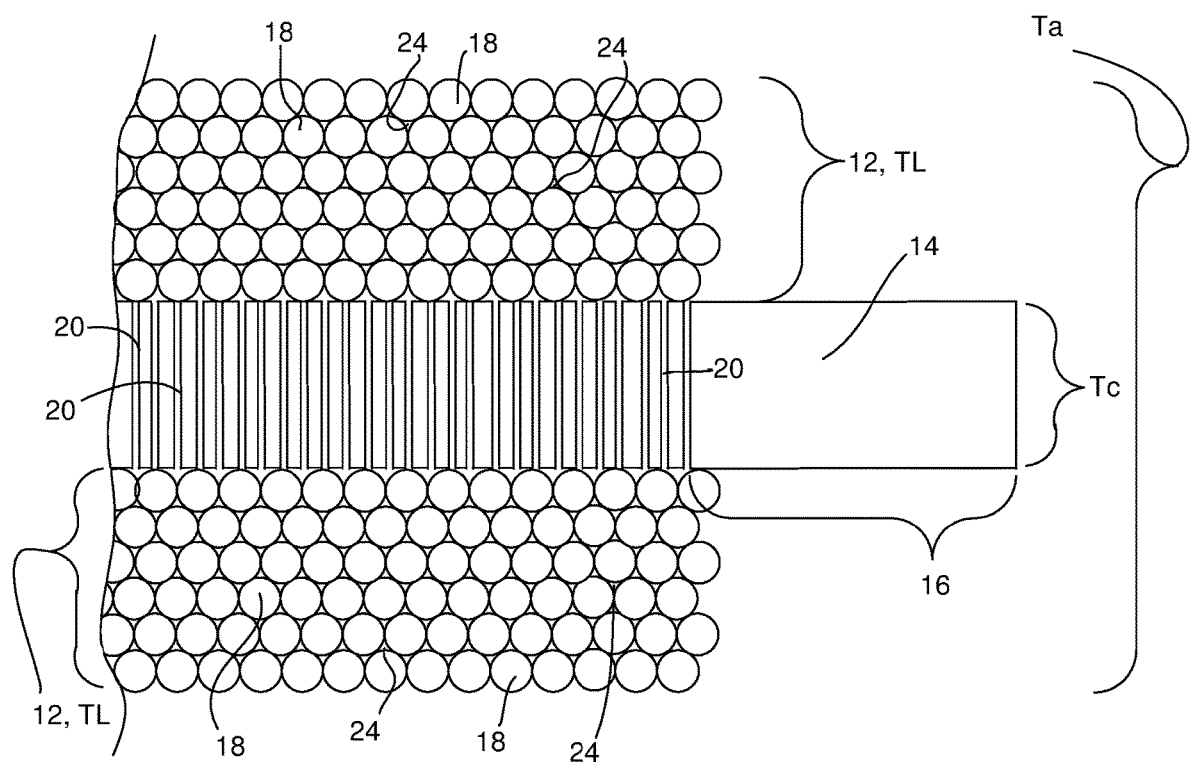

FIG. 1A through FIG. 1B illustrate the construction of an anode for use in a capacitor. FIG. 1A is a sideview of an anode 10 that is suitable for use in the capacitor. FIG. 1B is a cross-section of the anode shown in FIG. 1A taken along the line labeled B in FIG. 1A.

The anode 10 includes one or more active layers 12 on a current collector 14. The illustrated anode 10 includes the current collector 14 positioned between active layers 12. Suitable current collectors 14 include, but are not limited to, foils. FIG. 1A through FIG. 1C show a portion of the current collector 14 extending beyond the one or more active layers 12. The exposed portion of the current collector 14 is an optional tab 16 that can be used for providing electrical communication between the anode and a capacitor terminal.

The active layer 12 includes pores 24 that result from the voids between adjacent fused particles 18 and that are present throughout the active layer 12. The pores 24 have non-uniform diameters and/or non-uniform cross sections and follow tortuous pathways through the active layer 12. A suitable porosity for the active layer 12 includes, but is not limited to, porosity greater than 1%, 2% or 5% and/or less than 10%, 20% or 30%. An average width for the pores is greater than 0.1 µm, 1 µm, or 5 µm, and/or less than 100 µm, or 200 µm. The capacitance of a capacitor constructed with an anode according to FIG. 1A through FIG. 1B can often be increased by decreasing the average size of the particles 18 that are subsequently fused together because the reduced size provides an increase in surface area. Suitable average width and/or diameter for the particles includes, but is not limited to, an average width and/or diameter greater than 1 µm, 3 µm, or 6 µm, and/or less than 8 µm, 9 µm, or 10 µm.

The current collector includes through-hole tunnels 20 that extend from one face of the current collector to the other face of the current collector. Accordingly, the tunnels 20 allow an electrolyte to be transported from one side of the current collector to the other side of the current collector. Although the tunnels 20 are shown as unbranched, in some instances, all or a portion of the tunnels can include branches. The tunnel density can be selected such that the tunnels contribute to the capacitance of the anode. A suitable average tunnel density (number of tunnel entrances/area of a face of the current collector) include, average tunnel densities greater than 5 M/cm$^2$, 10 M/cm$^2$, or 20 M/cm$^2$, and/or less than 40 M/cm$^2$, 60 M/cm$^2$, or 90 M/cm$^2$. Additionally or alternately, a suitable porosity for the current collector includes, but is not limited to, porosity greater than 10%, 20% or 40% and/or less than 50%, 60% or 70%. In some instances, the tunnels have an average width or diameter greater than 0.5 µm, 1 µm, or 2 µm, and/or less than 5 µm, 7 µm, or 10 µm.

The thickness of the current collector 14 is labeled Tc in FIG. 1B. A suitable thickness for the current collector 14 includes a thickness greater than 10 µm, 20 µm, or 30 µm, and/or less than 150 µm, 170 µm, or 200 µm. The thickness of the active layers 12 are labeled TL in FIG. 1B. A suitable thickness for the active layers 12 (TL) includes a thickness greater than 50 µm, 100 µm, or 200 µm, and/or less than 400 µm, 1000 µm, or 2000 µm. The thickness of the anode is labeled Ta in FIG. 1B. A suitable thickness for the anode includes a thickness greater than 200 µm, 400 µm, or 800 µm, and/or less than 1000 µm, 2000 µm, or 5000 µm.

FIG. 2A is a sideview of a cathode 26 that is suitable for use in the capacitor. FIG. 2B is a cross-section of the cathode 26 shown in FIG. 2A taken along the line labeled B in FIG. 2A. The cathode 26 includes a cathode metal 30. Suitable cathode metals 30 include, but are not limited to, aluminum, titanium, and stainless steel. Although not illustrated, the cathode metal 30 can be layer of material on a substrate. For instance, the cathode metal 30 can be a titanium or titanium nitride coating on a substrate such as a metal and/or electrically conducting substrate. Examples of suitable substrates include, but are not limited to, aluminum, titanium, and stainless steel substrates. The cathode metal 30 can be the same as the anode metal or different from the anode metal. In some instances, the cathode metal 30 and the anode metal are both aluminum. Although not illustrated, an exposed portion of the cathode metal 30 can serve as an optional tab 16 that can be used for providing electrical communication between the cathode and a capacitor terminal.

The anodes 10 and cathodes 26 are generally arranged in an electrode assembly 32 where one or more anodes 10 are alternated with one or more cathodes 26. For instance, FIG. 3A is a cross section of an electrode assembly 32 where anodes 10 are alternated with cathodes 26. The anodes 10 and cathodes 26 can be constructed according to FIG. 1A through FIG. 2B. A separator 34 is positioned between anodes 10 and cathodes 26 that are adjacent to one another in the electrode assembly 32. The electrode assembly 32 typically includes the anodes 10 and cathodes 26 arranged in a stack or in a jelly roll configuration. Accordingly, the cross section of FIG. 3A can be a cross section of an electrode assembly 32 having multiple anodes 10 and multiple cathodes 26 arranged in a stack. Alternately, the cross section of FIG. 3A can be created by winding one or more anodes 10 together with one or more cathodes 26 in a jelly roll configuration. However, as the anodes 10 become more brittle due to increased surface area, it may not be practical or possible to form a jellyroll configuration. Suitable separators 34 include, but are not limited to, kraft paper, fabric gauze, and woven for non-woven textiles made of one or a composite of several classes of nonconductive fibers such as aramids, polyolefins, polyamides, polytetrafluoroethylenes, polypropylenes, and glasses.

The electrode assembly 32 is included in a capacitor. For instance, FIG. 3B is a schematic diagram of a capacitor that includes the electrode assembly 32 of FIG. 3A positioned in a capacitor case 36. Although not illustrated, the one or more anodes 10 in the electrode assembly 32 are in electrical communication with a first terminal 38 that can be accessed from outside of the capacitor case 36. The one or more cathodes 26 in the electrical assembly are in electrical communication with a second terminal 40 that can be accessed from outside of the capacitor case 36. In some instances, a tab included on one or more of the anodes 10 provides electrical communication between the one or more anodes 10 and the first terminal 38 and tab included on one or more of the cathodes 26 provides electrical communication between the one or more cathodes 26 and the second terminal 40. The capacitor can include one or more electrical insulators (not shown) positioned as needed to prevent shorts-circuits within the capacitor.

FIG. 3C is a cross section of a capacitor illustrating the positioning of the electrode assembly 32 relative to the capacitor case 36. The first terminal 38 and the second terminal 40 are not shown in FIG. 3C. The illustrated electrode assembly 32 includes anodes 10 and cathodes 26 stacked such that anodes 10 are alternated with cathodes 26 and separators 34 are positioned between adjacent anodes 10 and cathodes 26. The upper side of the capacitor case 36 is curved. In order to make best use of the space that is available in the case, the electrode assembly 32 is configured to conform to the interior of the capacitor case 36. As a result, a portion of the anodes 10 and/or cathodes 26 can have tapered edges that allow these electrodes to be positioned adjacent to the curved portion of the capacitor case 36. As is evident in FIG. 3C, the ability to shape the electrode edges increases the packing efficiency of the electrodes within the capacitor case. Further, the conduits may make it possible to use a thicker anode. The use of thicker anodes can also improve packing efficiency because fewer anodes would be needed in the capacitor case. When the disclosed anodes are included in an Implantable Cardioverter Defibrillator (ICD), a suitable thickness for the anodes may include a thickness greater than 100 µm or 400 µm and/or less than 1000 µm or 2000 µm. Additionally or alternatively, different electrodes within the electrode assembly 32 can have different sizes. For instance, the electrodes closer to the top of the capacitor case 36 shown in FIG. 3C can have a smaller width (labeled w in FIG. 3C) or diameter.

Figure 3D:
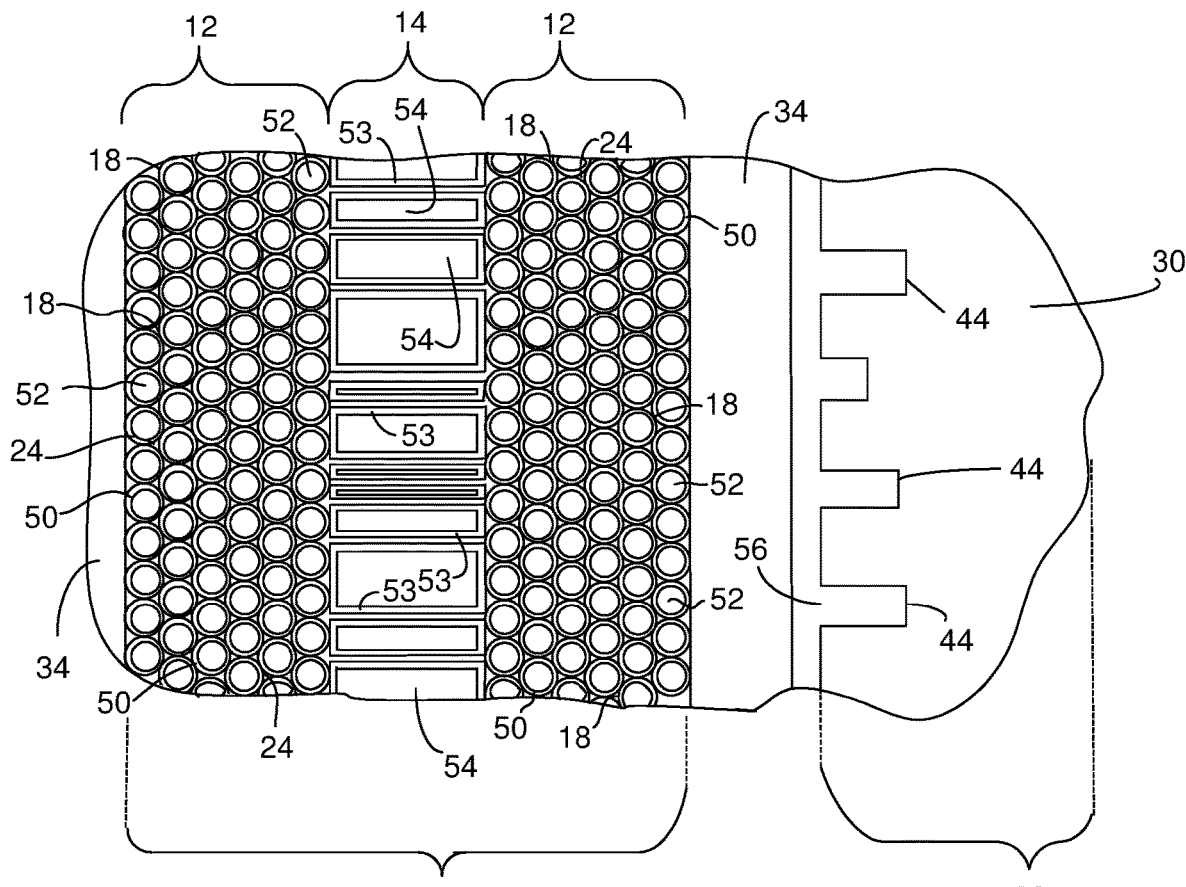
FIG. 3D is a sideview of an interface between an anode and a cathode that are adjacent to one another in the capacitor of FIG. 3B.

FIG. 3D is a sideview of an interface between an anode 10 and a cathode 26 that are adjacent to one another in the capacitor of FIG. 3B. The illustration in FIG. 3D is magnified so it shows features of the anode 10 and cathode 26 that are not shown in FIG. 2A and FIG. 2B. For instance, the surface of the cathode 26 optionally includes cathode channels 44 that extend into the cathode metal 30 so as to increase the surface area of the cathode metal 30. Suitable cathode channels 44 include, but are not limited to, pores, trenches, tunnels, recesses, and openings.

Other constructions of the cathode are possible. For instance, the cathode and include a metal oxide such as $RuO_2$ or a metal nitride such as TiN on a substrate. In these instances, suitable substrates include but are not limited to, foils, meshes, and expanded metal. Suitable materials for the substrate include, but are not limited to, aluminum, titanium, and stainless steel. Another option for the anode is for the anode of FIG. 3D to exclude the cathode channels 44. As a result, the cathode can include, consist of, or consist essentially of a cathode metal 30 with smooth faces, i.e. without cathode channels 44. In some instances, the cathode includes, consist of, or consist essentially of the cathode metal 30 with smooth faces and without any coatings or other materials of the faces of the cathode metal.

The particles 18 in the active layer 12 of the anode 10 include, consist of, or consist essentially of a layer of a dielectric 50 on a core 52. The cores 52 can be electrically conducting and one or more of the cores 52 can be in direct physical contact with one another and with the current collector 14. For instance, although not shown in FIG. 3D, the active layer 12 can be fabricated such that the cores 52 contact one another and the current collector 14 such that there is an electrical pathway between different cores 52 and also between the cores 52 and the current collector. As a result, the cores 52 are in electrical communication with the current collector 14.

In some instances, the dielectric 50 is an anode metal oxide and the core 52 is an electrical conductor such as an anode metal. The anode metal oxide can be an oxide of an anode metal included in the core 52. Suitable anode metals include, but are not limited to, aluminum, tantalum, magnesium, titanium, niobium, and zirconium. Many anode metal oxides can exist in more than one phase within the same material state (solid, liquid, gas, plasma).

The current collector 14 includes, consists of, or consists essentially of a layer of anode metal oxide 53 over a layer of an anode metal 54. The anode metal oxide 53 is positioned on the surface of the anode metal 54 and a surface(s) of the anode metal oxide 53 defines the tunnels 20. The anode metal 54 can be the same or different from the material for the core 52 and/or the anode metal oxide 53 can be the same or different from the material for the dielectric 50. In one example, cores 52 are the same material as the anode metal 54 and the anode metal oxide 53 and the dielectric 50 are both an oxide of the anode metal 54. Suitable anode metals 54 include, but are not limited to, aluminum, tantalum, magnesium, titanium, niobium, and zirconium.

An electrolyte 56 is in contact with the separator 34, the anode 14 and the cathode 26. The electrolyte 56 can be positioned in the pores 24 of the active layers 12. In some instances, the dielectric 20, an oxide, and the current collector 14 can prevent direct contact between the cores 52 and the electrolyte 56. For instance, the oxide can form on the surface of the core 52 when the electrolyte 56 and core come into contact while an electrical potential is applied to the cores 52.

When the cathode metal 30 includes cathode channels 44, the electrolyte 56 can be positioned in the cathode channels 44. The electrolyte 56 can be a liquid, solid, gel or other medium and can be absorbed in the separator 34. The electrolyte 56 can include one or more salts dissolved in one or more solvents. For instance, the electrolyte 56 can be a mixture of a weak acid and a salt of a weak acid, preferably a salt of the weak acid employed, in a polyhydroxy alcohol solvent. The electrolytic or ion-producing component of the electrolyte 56 is the salt that is dissolved in the solvent.

A capacitor constructed according to FIG. 3A through FIG. 3D can be an electrolytic capacitor such as an aluminum electrolytic capacitor, a tantalum electrolytic capacitor or a niobium electrolytic capacitor. An electrolytic capacitor is generally a polarized capacitor where the anode metal oxide serves as the capacitor dielectric and the electrolyte 56 effectively operates as the cathode.

Figure 4A:
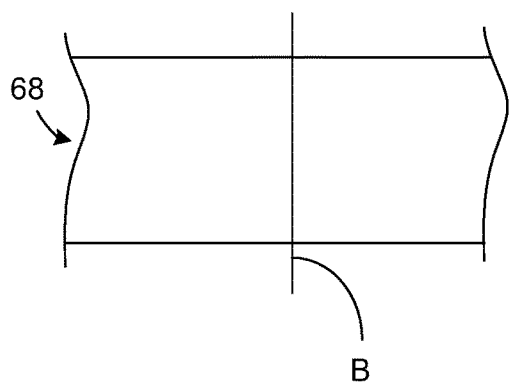
FIG. 4A through FIG. 4H illustrate a method of generating an anode for use in a capacitor constructed according to FIG. 3A through FIG. 3D.
Figure 4B:
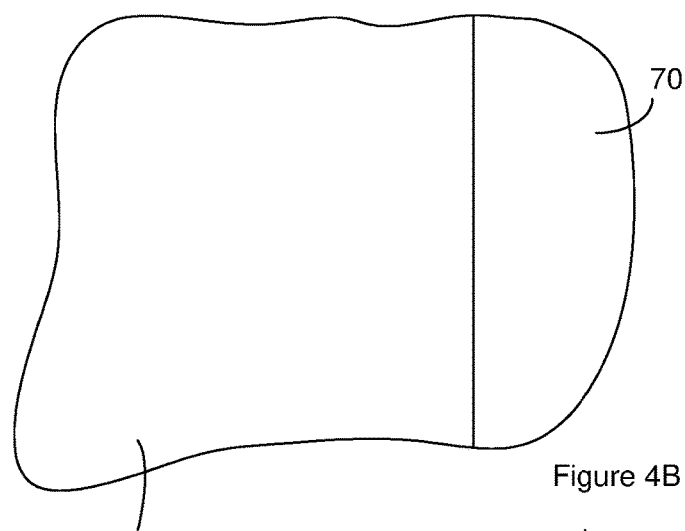

FIG. 4A through FIG. 4H illustrate a method of generating an anode 10 for use in a capacitor constructed according to FIG. 3A through FIG. 3D. A sheet of material 68 can acquired either by fabrication or purchase from a supplier. As will be evident below, one or more anodes are constructed from the sheet of material 68. FIG. 4A is a topview of the sheet and shows a face of the sheet positioned between edges. FIG. 4B is a cross section of a portion the sheet taken at an interface between a face of the sheet of material 68 and the atmosphere 70 in which the sheet is positioned. In some instances, the sheet of material 68 includes, consists of, or consists essentially of the anode metal 53.

Figure 4C:
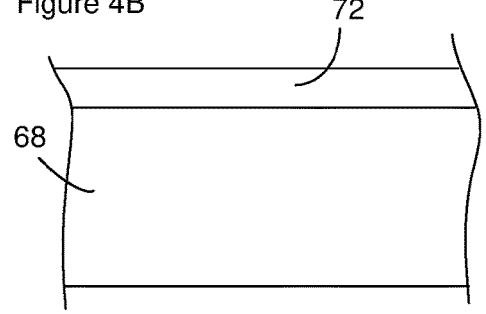

When the anode is to have a tab region on which active layer is not positioned, a mask 72 such as a pothotoresist can be positioned on the tab region of the sheet of material 68 so as to provide an anode precursor according to FIG. 4C.

Figure 4D:
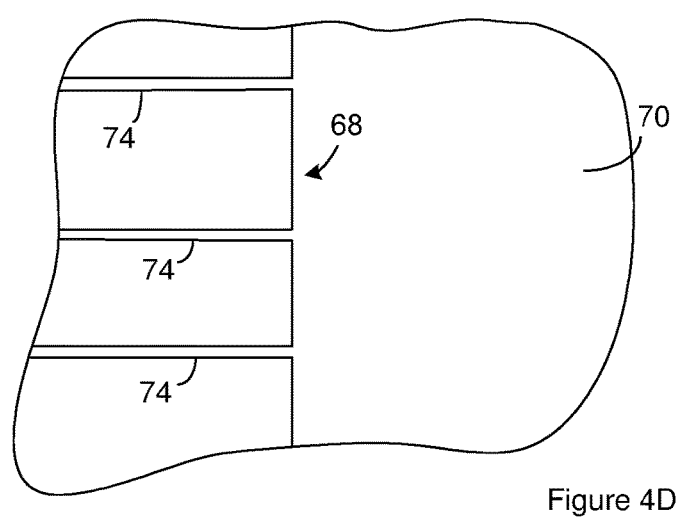

Preliminary tunnels 74 can be formed in the sheet of material 68 so as to provide the sheet of material 68 with the cross section of FIG. 4D. Although not shown in FIG. 4D, the preliminary tunnels 74 extend through the sheet of material 68. Suitable methods of forming the preliminary tunnels 74 include, but are not limited to, laser removal and/or drilling, etching such as chemical etching and electrochemical etching. In one example, the etching is electrochemical etching or electrochemical drilling. In electrochemical etching and/or electrochemical drilling, the sheet of material 68 is at least partially immersed in a bath that includes, consists of, or consists essentially of an electrochemical drilling (ECD) solution initially having a pH of less than 5 while passing an electrical current through the sheet of material 68.

In some instances, the preliminary tunnels 74 are widened. Widening of the preliminary tunnels 74 can reduce or stop the anode metal oxide from filling the tunnels 20. For instance, the distance across the preliminary tunnels 74 on the sheet of FIG. 4D can be increased to provide a sheet of material 68 having the channels 76 shown in the cross section of FIG. 4E. In some instances, the preliminary tunnels 74 are formed and widened so as to remove more than 5% or 10% of the sheet of material 68 from the sheet of material 68 and/or to create more than 20 million channels/cm' of the sheet of material 68.

Suitable methods for widening the preliminary tunnels 74 include, but are not limited to, chemical and electrochemical processes. In one example, widening of the preliminary tunnels 74 includes immersing at least a portion of the sheet of material 68 in an electrolyte solution that includes, consists of, or consists essentially of a chloride or nitrate.

Figure 4E:
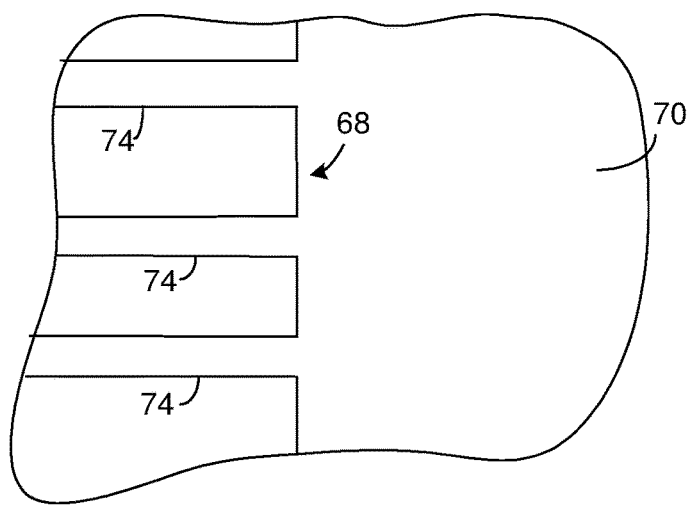

When the mask 72 disclosed in the context of FIG. 4C was placed on the sheet of material 68, the mask 72 can be removed from the sheet of material constructed according to FIG. 4E.

Figure 4F:
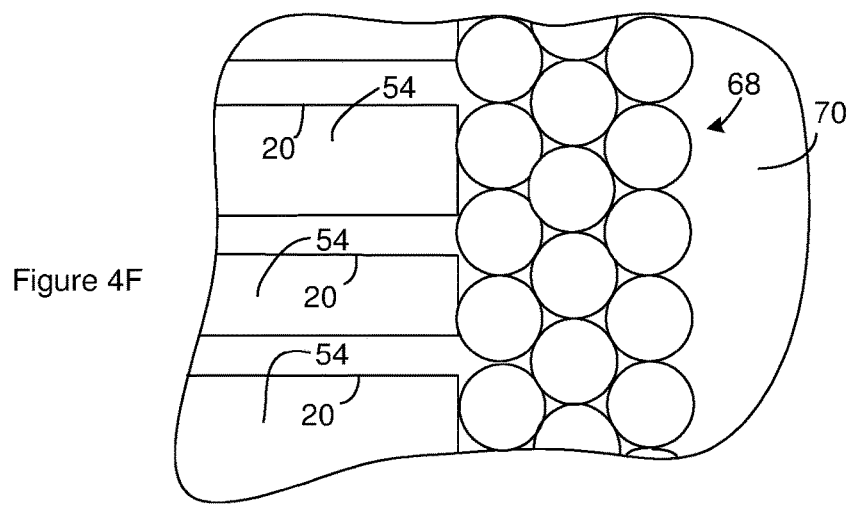

When a mask 72 is not present on a sheet of material 68 constructed according to FIG. 4E or after the mask 72 has been removed, the particles are applied to the sheet of material 68 in the desired location(s). For instance, FIG. 4F is a cross section of the sheet of material 68 of FIG. 4E modified to include the fused particles 18. Suitable methods of adding the fused particles 18 to the sheet of material 68 of FIG. 4E include, but are not limited to, sintering of powder on the sheet of material 68. Sintering includes pressing and/or compacting the powder without melting the powder to the point of liquefaction. Heat may or may not be applied during the sintering process.

In some instances, the powder used in generating the sheet of material 68 of FIG. 4F can have a constant diameter or width. However, in other instances, the powder used in generating the sheet of material 68 can have a variety of different diameters or widths. Since smaller particles can fit into the pores 24 between larger particles, a variety of different powder sizes can increase the surface area of the active layer 12. Suitable diameters or widths or average diameters or average widths for the powder can be greater than 2 µm, 4 µm, or 5 µm, and/or less than 6 µm, 7 µm, or 10 µm. Suitable powders include, but are not limited to, aluminum, tantalum, magnesium, titanium, niobium, and zirconium.

Figure 4G:
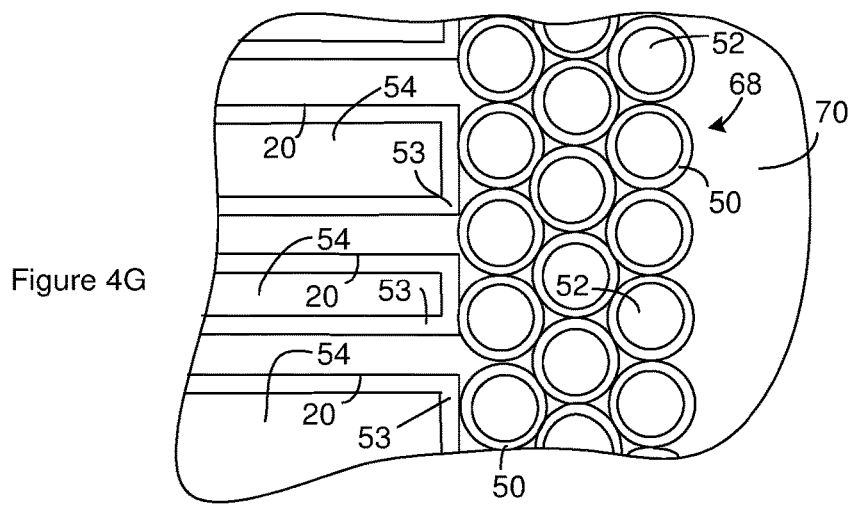

The fused particles 18 in the sheet of material 68 of FIG. 4F can be modified to include the dielectrics 50 and cores 52 as shown in the sheet of material 68 of FIG. 4G. Additionally, the anode metal oxide 53 can be formed on the anode metal 54 that is exposed in the sheet of material 68. For instance, the anode metal oxide 53 can be formed in and/or on the anode metal 54 that is exposed in FIG. 4F so as to provide a sheet of material 68 according to FIG. 4G. FIG. 4G is a cross section of the sheet of material 68.

As is evident in FIG. 4G, the anode metal oxide 53 is formed on at a portion of the faces of the sheet of material and in the interiors of the preliminary tunnels 74. A channel in the anode metal oxide 53 serves as the tunnels 20. Forming the anode metal oxide 12 on the exposed anode metal 14 can include converting a portion of the existing anode metal 14 to the anode metal oxide 12. Converting a portion of the existing anode metal 14 to the anode metal oxide 12 can include reacting the anode metal 14 with a component such as oxygen.

When the fused particles 18 are an anode metal, the dielectrics 50 can be an oxide of the anode metal. An example of a suitable method of forming an anode metal oxide dielectric 50 on the fused particles 18 includes mechanisms that convert existing anode metal to anode metal oxide. In these mechanisms, a portion of the fused particles 18 is converted to an oxide that serves as the dielectric 50 while another portion of the fused particles 18 is not converted and serves as the core 52. A suitable method for converting an existing anode metal to an anode metal oxide includes, but is not limited to, anodic oxidation. In anodic oxidation, the sheet of material 68 is placed in an electrolytic bath while a positive voltage is applied to the sheet of material 68. The thickness of the layer of anode metal oxide can be increased by increasing the applied voltage. In one example of anodic oxidation, the anode metal oxide is formed by placing the sheet of material 68 in citric acid while a positive voltage of 400-550 volts is applied to the sheet of material 68 for a period of time. Additionally or alternately, the electrical current that results from the applied voltage can be monitored and the sheet of material 68 can be removed from the electrolytic solution in response to the electrical current falling below a threshold exit leakage current.

In some instances, the inclusion of the dielectrics 50 on the cores 52 is concurrent with the formation of the anode metal oxide 53 on the anode metal 54. For instance, methods of forming the dielectrics 50 on the cores 52 can also be suitable for forming the anode metal oxide 53 on the anode metal 54. As an example, the anodic oxidation described in the context of forming the dielectrics 50 on the cores 52 can also be used to form of the anode metal oxide 53 on the anode metal 54. Accordingly, an anodic oxidation process that forms the dielectrics 50 on the cores 52 can concurrently form the anode metal oxide 53 on the anode metal 54.

Figure 4H:
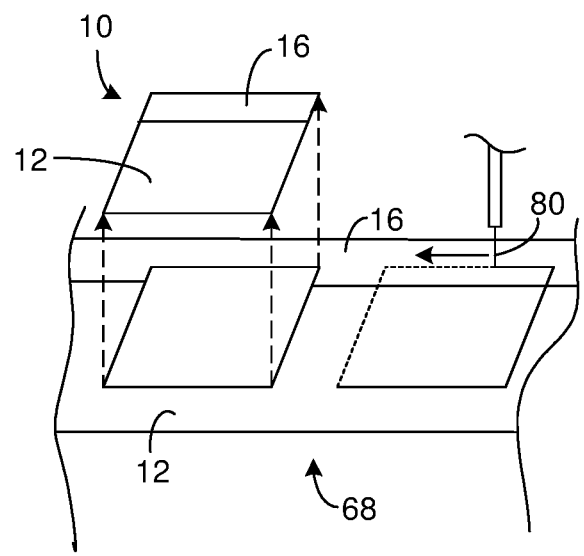

One or more anodes can be extracted from the sheet of material 68 of FIG. 4G. Accordingly, a portion of the sheet of material 68 becomes the anode(s). Suitable methods of removing an anode precursor from the sheet of material 68 include, but are not limited to cutting the anode precursor(s) out of the sheet of material 68. A suitable method of cutting the anode precursor(s) out of the sheet of material 68 include mechanical cutting method such as die cutting where the anode precursor is punched or stamped from a sheet of material 68 using a mechanical die. Another suitable method of cutting the anode precursor(s) out of the sheet of material 68 includes no-contact cutting methods such as laser cutting of the anode precursor. FIG. 4H illustrates use of a laser 80 to remove an anode the sheet of material 68.

Figure 5:
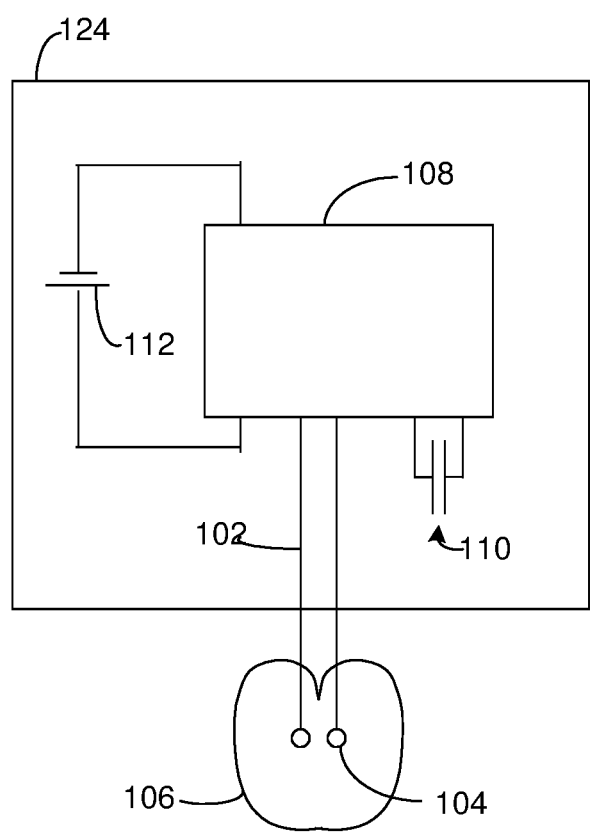
FIG. 5 is a schematic diagram of a defibrillation system that includes an Implantable Cardioverter Defibrillator (ICD) that employs one or more capacitors constructed according to FIG. 1A through FIG. 4H.

The above capacitors can be used in medical devices such as an Implantable Cardioverter Defibrillator (ICD). FIG. 5 is a schematic diagram of a defibrillation system that includes an Implantable Cardioverter Defibrillator (ICD) that employs one or more capacitors constructed as disclosed above. The defibrillation system includes lead lines 102 connected to electrodes 104 in contact with the heart. Although the defibrillation system is shown with two electrodes 104, the defibrillation system may include three or more electrodes 104 and/or three or more lead lines. The specific positions of the electrodes 104 relative to the heart 106 are dependent upon the requirements of the patient.

The defibrillation system also includes a processing unit 108. The lead lines 102 provide electrical communication between the processing unit 108 and the electrodes 104. The processing unit 108 is also in electrical communication with one or more capacitors constructed as disclosed above.

The processing unit 108 receives power from a battery 112. The processing unit 108 can place the battery 112 in electrical communication with the one or more of the capacitors 110. For instance, the processing unit 108 can cause the battery 112 to charge the one or more capacitors 110. Additionally, the processing unit 108 can place the one or more capacitors 110 in electrical communication with the lead lines 102. For instance, the processing unit 108 can cause the one or more capacitors to be discharged such that electrical energy stored in the one or more capacitors is delivered to the heart through all or a portion of the electrodes 104. The processing unit 108, the battery 112 and the one or more capacitors 110 are positioned in a case 124.

During operation of the defibrillation system, the defibrillation system employs output from the lead lines 102 to monitor the heart and diagnose when defibrillation shocks should be provided. When the processing unit 108 identifies that defibrillation shocks are needed, the processing unit 108 provides the heart with one or more defibrillation shocks. To provide a defibrillation shock, the processing unit 108 employs energy from the battery 112 to charge the one or more capacitors 110. Once the one or more capacitors are charged, the processing unit 108 causes these capacitors to be discharged such that energy stored in the capacitors is delivered to the heart through all or a portion of the electrodes 104 in the form of defibrillation shocks. During the defibrillation shocks, the defibrillator requires that one or more pulses be delivered from the battery 112 to the one or more capacitors. Each pulse is generally associated with a defibrillation shock. The duration of each pulse is generally about 8 to 12 seconds with the pulses separated by a delay time that is based on how fast the battery charges the capacitor and determining the appropriate point to provide the defibrillation shock.

Suitable processing units 108 can include, but are not limited to, analog electrical circuits, digital electrical circuits, processors, microprocessors, digital signal processors (DSPs), computers, microcomputers, or combinations suitable for performing the monitoring and control functions. In some instances, the processing unit 108 has access to a memory that includes instructions to be executed by the processing unit 108 during performance of the control and monitoring functions.

The sequence of events disclosed above for forming an anode can be performed in a sequence other than the disclosed sequence. For instance, the oxide phase extraction can be performed on an anode precursor(s) before the capacitor is assembled.

Example 1

A 115 μm high cubicity aluminum foil is electrochemically etched to produce over 20M/cm$^2$ through tunnels on the foil. The etched foil is then electrochemically widened to enlarge the tunnel diameter to greater than 1 μm. Both side of the etched and widened foil is fused with 3 μm diameter aluminum powder for a total anode thickness of 480 μm. The aluminum anode is electrochemically formed to have an oxide layer that can support 500 V of voltage. The formed anode is cut to a desired shape that can fit into a capacitor case. The anode is then assembled into a stack and sealed in a capacitor. The DSR for such a capacitor is greater than or equal to 90%.

Example 2

A 130 μm high cubicity aluminum foil is electrochemically etched to produce over 20M/cm$^2$ through tunnels on the foil. The etched foil is then electrochemically widened to enlarge the tunnel diameter to greater than 1 μm. Both side of the etched and widened foil is fused with 5 μm diameter aluminum powder for total anode thickness of 850 μm. The aluminum anode is electrochemically formed an oxide layer that can support 500 V of voltage. The formed anode is cut to a desired shape that can fit into a capacitor case. The anode is then assembled into a stack and sealed in a capacitor case. The DSR for such a capacitor is greater than or equal to 90%.

Although the anodes are disclosed above as having an active layer on both faces of a current collector, a single face of a current collector can have an active layer while the opposing face of the current collector does not have an active layer.

Although the anode is disclosed in the context of a capacitor, the disclosed methods of increasing electrode area can be employed in the electrodes of other electrochemical devices such as batteries, fuel cells, and solar cells.

The above method of fabricating an anode can capacitor can be viewed as a sequence of steps. However, the disclosed steps can be performed in a sequence other than the disclosed sequence. Additionally or alternately, additional steps can operationally be performed between the disclosed steps.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A capacitor, comprising:
   an anode with one or more active layers that each includes fused particles, the one or more active layers being positioned on a tunneled portion of an aluminum current collector; and
   the tunneled portion of the current collector has tunnels that extend from a first face of the current collector to a second face of the current collector,
   all of the tunnels that extend from the first face of the current collector to the second face of the current collector and are under the one or more active layers have an average width of greater than 2 μm and less than 10 μm and an average tunnel density greater than 5 M/cm$^2$ and less than 90 M/cm$^2$.

2. The capacitor of claim 1, wherein the current collector is positioned between active layers.

3. The capacitor of claim 2, wherein the active layers do not contact one another through the tunnels.

4. The capacitor of claim 1, wherein a thickness of at least one of the one or more active layers is greater than 150 µm.

5. The capacitor of claim 1, wherein a thickness of the current collector is less than 200 µm.

6. The capacitor of claim 1, wherein a thickness of the anode is more than 400 µm; and
a thickness of the current collector is less than 200 µm.

7. The capacitor of claim 1, wherein the one or more active layers are not positioned over a portion of the current collector.

8. The capacitor of claim 1, wherein the fused particles include aluminum and an electrolyte in the tunnels is a liquid.

9. The capacitor of claim 1, wherein the one or more active layers are not positioned over a tab portion of the current collector, the tab portion of the current collector excluding the tunnels and providing electrical communication between the anode and a terminal that is accessible from outside of a case for the capacitor.

10. The capacitor of claim 1, wherein the particles have an average width greater than 6 µm.

11. The capacitor of claim 10, wherein a porosity of the active layers is greater than 5% and less than 20%.

12. The capacitor of claim 1, wherein an average width of the particles exceeds the average width of the tunnels.

13. The capacitor of claim 1, wherein an electrolyte is positioned in the tunnels.

14. The capacitor of claim 1, wherein the capacitor has a Delivered to Stored energy Ratio (DSR) greater than 90%.

15. The capacitor of claim 1, wherein the current collector includes a tab portion that excludes the tunnel portion and that provides electrical communication between the anode and a terminal that is accessible from outside of a case for the capacitor.

16. A method of forming an anode for a capacitor, comprising:
generating tunnels in a tunneled portion of an aluminum current collector such that the tunnels extend from a first face of the current collector to a second face of the current collector,
adding one or more active layers over the tunneled portion of the current collector such that all of the tunnels that extend from the first face of the current collector to the second face of the current collector and are under the one or more active layers have an average width greater than 2 µm and less than 10 µm and have an average tunnel density greater than 5 M/cm$^2$ and less than 90 M/cm$^2$, and
the one or more active layers including fused particles; and
fabricating the capacitor such that the anode is in electrical communication with a terminal that is accessible from outside of a case of the capacitor.

17. The method of claim 16, wherein the tunnels are generated in the current collector before the one or more active layers are added to the current collector.

18. The method of claim 16, further comprising:
generating a layer of an anode metal oxide in an interior of the tunnels after the one or more active layers are added to the current collector.

19. The method of claim 16, wherein the particles include a dielectric on a core and the dielectrics are generated on the core concurrently with an anode metal oxide being generated in an interior of the tunnels.

* * * * *